(12) United States Patent
Bai et al.

(10) Patent No.: US 9,769,660 B2
(45) Date of Patent: Sep. 19, 2017

(54) METHOD FOR IMPLEMENTING SIM CARD FUNCTION ON TERMINAL, TERMINAL, AND UICC

(71) Applicant: Huawei Technologies Co., Ltd., Shenzhen, Guangdong (CN)

(72) Inventors: Zhidong Bai, Shenzhen (CN); Bin Xu, Shenzhen (CN); Shaopeng He, Shenzhen (CN); Guangzhu Zeng, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 67 days.

(21) Appl. No.: 14/670,221

(22) Filed: Mar. 26, 2015

(65) Prior Publication Data

US 2015/0208239 A1 Jul. 23, 2015

Related U.S. Application Data

(63) Continuation of application No. PCT/CN2013/084382, filed on Sep. 27, 2013.

(30) Foreign Application Priority Data

Sep. 27, 2012 (CN) .......................... 2012 1 0370036

(51) Int. Cl.
*H04M 1/66* (2006.01)
*H04M 1/68* (2006.01)
(Continued)

(52) U.S. Cl.
CPC ........ *H04W 12/06* (2013.01); *G06F 9/44557* (2013.01); *H04L 63/0853* (2013.01);
(Continued)

(58) Field of Classification Search
CPC ..... H04W 12/12; H04W 12/06; H04W 8/245; H04W 8/18; H04B 1/3816; H04M 1/72533
(Continued)

(56) References Cited

U.S. PATENT DOCUMENTS 7,231,046 B1 * 6/2007 Einola ................. H04L 63/0457
370/466
8,571,537 B2 10/2013 Kaliner
(Continued)

FOREIGN PATENT DOCUMENTS

CN 1449214 A 10/2003
CN 1561621 A 1/2005
(Continued)

OTHER PUBLICATIONS

Menezes, P. van Oorschot, et al., "Handbook of Applied Cryptography, Chapter 10: Identification and Entity Authentication", CRC Press, 1996, p. 385-424, XP001525010.
(Continued)

*Primary Examiner* — Steve D Agosta

(57) ABSTRACT

The present invention discloses a method for implementing a SIM card function on a terminal, a terminal and a UICC. The method includes: downloading information for implementing the SIM card function; writing the information for implementing the SIM card function into a reserved storage space of the terminal; and after the SIM card is activated, authenticating an access identity of a terminal user by using the information for implementing the SIM card function. In the present invention, the information for implementing the SIM card function is downloaded to the terminal, so as to implement the SIM card function by means of software.

12 Claims, 6 Drawing Sheets

(51) Int. Cl.
    *H04M 3/16*         (2006.01)
    *H04W 12/06*      (2009.01)
    *H04L 29/06*       (2006.01)
    *H04W 8/18*        (2009.01)
    *H04W 8/22*        (2009.01)
    *H04W 4/00*        (2009.01)
    *G06F 9/445*       (2006.01)
    *H04W 12/04*      (2009.01)

(52) U.S. Cl.
    CPC ............ *H04W 4/001* (2013.01); *H04W 4/003* (2013.01); *H04W 8/183* (2013.01); *H04W 8/22* (2013.01); *H04W 12/04* (2013.01)

(58) Field of Classification Search
    USPC ..... 455/410, 411, 418, 419, 420, 432.3, 558
    See application file for complete search history.

(56) References Cited

U.S. PATENT DOCUMENTS

| | | | |
|---|---|---|---|
| 2003/0227554 A1* | 12/2003 | Kazami | H04N 1/00129 348/231.3 |
| 2004/0157584 A1* | 8/2004 | Bensimon | H04W 12/06 455/411 |
| 2004/0260791 A1* | 12/2004 | Jerbi | H04L 12/5895 709/219 |
| 2005/0021875 A1* | 1/2005 | Bouthemy | H04W 92/08 709/250 |
| 2008/0051062 A1 | 2/2008 | Lee | |
| 2009/0163175 A1 | 6/2009 | Shi et al. | |
| 2009/0191846 A1* | 7/2009 | Shi | G06F 21/32 455/411 |
| 2010/0311418 A1 | 12/2010 | Shi et al. | |
| 2011/0136482 A1 | 6/2011 | Kaliner | |
| 2011/0306318 A1 | 12/2011 | Rodgers et al. | |

FOREIGN PATENT DOCUMENTS

| | | |
|---|---|---|
| CN | 101137154 A | 3/2008 |
| CN | 101150816 A | 3/2008 |
| CN | 101222712 A | 7/2008 |
| CN | 101540804 A | 9/2009 |
| CN | 101764845 A | 6/2010 |
| CN | 101933346 A | 12/2010 |
| CN | 102047705 A | 5/2011 |
| CN | 102917338 A | 2/2013 |
| WO | WO 2009/141024 A1 | 11/2009 |
| WO | WO 2011/159549 A1 | 12/2011 |

OTHER PUBLICATIONS

"Smart Cards; UICC-Terminal interface; Physical and logical characteristics (Release 8)", ETSI TS 102 221 v8.5.0, Oct. 2010, 174 pages.

"3rd Generation Partnership Project; Technical Specification Group Core Network and Terminals; AT command set for User Equipment (UE) (Release 11)", 3GPP TS 27.007 v11.4.0, Sep. 2012, 276 pages.

"3rd Generation Partnership Project; Technical Specification Group Terminals; Specification of the Subscriber Identity Module—Mobile Equipment (SIM—ME) interface (Release 5)", 3GPP TS 51.011 v5.0.0, Dec. 2001, 161 pages.

* cited by examiner

METHOD FOR IMPLEMENTING SIM CARD FUNCTION ON TERMINAL, TERMINAL, AND UICC

CROSS-REFERENCE TO RELATED APPLICATION

This application is a continuation of International Application No. PCT/CN2013/084382, filed on Sep. 27, 2013, which claims priority to Chinese Patent Application No. 201210370036.X, filed on Sep. 27, 2012, both of which are hereby incorporated by reference in their entireties.

TECHNICAL FIELD

The present invention relates to the field of communications technologies, and in particular, to a method for implementing a subscriber identity module (Subscriber Identity Module, SIM) card function on a terminal, a terminal and a universal integrated circuit card (Universal Integrated Circuit Card, UICC).

BACKGROUND

A subscriber identity module (Subscriber Identity Module, SIM) card applied in an existing Global System of Mobile Communications (Global System of Mobile Communications, GSM) is also called a smart card, a subscriber identity card, or the like. A SIM card is generally a chip, which can be disposed inside a mobile terminal, and is used to store content of the mobile terminal, such as subscriber information, an cipher key, and a user phonebook, and is provided for a GSM network to authenticate an identity of a subscriber and encrypt voice information during a call of the subscriber, and the like.

A SIM card in the prior art is generally a chip provided with a microprocessor and a hardware structure. When a user carrying a terminal roams between different regions, the user usually chooses to use a SIM card registered in a roamed-to region in order to reduce roaming charges. Because a SIM card in the prior art is a chip provided with a hardware structure, when the SIM card is replaced, the user needs to insert another SIM card into a reserved position of the terminal. When roaming between different regions, the user needs to replace the SIM card frequently, which causes inconvenience of use and affects user experience.

SUMMARY

Embodiments of the present invention provide a method for implementing a SIM card function on a terminal, a terminal and a UICC, so as to solve a problem of poor user experience due to inconvenience with SIM card replacement in the prior art.

In order to solve the foregoing technical problem, the embodiments of the present invention disclose the following technical solutions:

In a first aspect, a method for implementing a SIM card function on a terminal is provided, where the method includes:

downloading information for implementing the SIM card function;

writing the information for implementing the SIM card function into a reserved storage space of the terminal; and after the SIM card is activated, authenticating an access identity of a terminal user by using the information for implementing the SIM card function.

With reference to the first aspect, in a first possible implementation manner, the information for implementing the SIM card function includes SIM communication information, an encryption algorithm and a encryption algorithm key; and the writing the information for implementing the SIM card function into a reserved storage space of the terminal includes:

writing the encryption algorithm into a first reserved storage space of the terminal;

writing the encryption algorithm key into a second reserved storage space of the terminal; and writing the SIM communication information into a third reserved storage space of the terminal.

With reference to the first possible implementation manner, in a second possible implementation manner, the authenticating an access identity of a terminal user by using the information for implementing the SIM card function includes:

loading the encryption algorithm and the encryption algorithm key to a random access memory RAM of the terminal;

using a random number issued by a network side and the encryption algorithm key as input parameters of the encryption algorithm, and executing the encryption algorithm; and determining an identity authentication result for the terminal user according to an execution result of the encryption algorithm.

With reference to the first possible implementation manner or the second possible implementation manner, in a third possible implementation manner, the method further includes:

when use of the SIM card is stopped, erasing the encryption algorithm from the first reserved storage space, and erasing the encryption algorithm key from the second reserved storage space.

In a second aspect, another method for implementing a SIM card function on a terminal is provided, where the method is applied to a terminal that includes a universal integrated circuit card UICC, and the method includes:

saving, by the UICC, information downloaded by the terminal for implementing the SIM card function into a reserved storage space on the UICC;

receiving, by the UICC, an instruction to activate the SIM card; and performing, by the UICC according to the activation instruction, confidential processing on the information for implementing the SIM card function to obtain a processing result, so that the terminal authenticates an access identity of a terminal user according to the processing result.

With reference to the first aspect, in a first possible implementation manner, the information for implementing the SIM card function includes SIM communication information, a encryption algorithm and a encryption algorithm key; and the saving, by the UICC, information downloaded by the terminal for implementing the SIM card function into a reserved storage space on the UICC includes:

saving, by the UICC, the encryption algorithm downloaded by the terminal into a first reserved storage space on the UICC;

saving, by the UICC, the encryption algorithm key downloaded by the terminal into a second reserved storage space on the UICC; and saving, by the UICC, the SIM communication information downloaded by the terminal into a third reserved storage space on the UICC.

With reference to the first possible implementation manner, in a second possible implementation manner, the performing, by the UICC according to the activation instruction, confidential processing on the information for implementing the SIM card function to obtain a processing result includes:

after receiving the activation instruction, loading, by the UICC, the encryption algorithm and encryption algorithm key to a RAM of the UICC;

using, by the UICC, a random number issued by a network side and the encryption algorithm key as input parameters of the encryption algorithm, and executing the encryption algorithm; and outputting, by the UICC, an execution result of the encryption algorithm; and that the terminal authenticates an access identity of a terminal user according to the processing result is specifically that the terminal determines an identity authentication result for the terminal user according to the execution result.

With reference to the first possible implementation manner or the second possible implementation manner, in a third possible implementation manner, the method further includes:

when use of the SIM card is stopped, erasing, by the UICC, the encryption algorithm from the first reserved storage space, and erasing the encryption algorithm key from the second reserved storage space.

In a third aspect, a terminal is provided, where the terminal includes:

a downloading unit, configured to download information for implementing a SIM card function;

a writing unit, configured to write the information downloaded by the downloading unit for implementing the SIM card function into a reserved storage space of the terminal; and an authenticating unit, configured to, after the SIM card is activated, authenticate an access identity of a terminal user by using the information written by the writing unit for implementing the SIM card function.

With reference to the first aspect, in a first possible implementation manner, the information downloaded by the downloading unit for implementing the SIM card function includes SIM communication information, a encryption algorithm and a encryption algorithm key; and the writing unit includes:

a first writing subunit, configured to write the encryption algorithm into a first reserved storage space of the terminal;

a second writing subunit, configured to write the encryption algorithm key into a second reserved storage space of the terminal; and a third writing subunit, configured to write the SIM communication information into a third reserved storage space of the terminal.

With reference to the first possible implementation manner, in a second possible implementation manner, the authenticating unit includes:

an information loading subunit, configured to load the encryption algorithm and the encryption algorithm key to a RAM of the terminal;

an algorithm executing subunit, configured to use a random number issued by a network side and the encryption algorithm key as input parameters of the encryption algorithm, and execute the encryption algorithm; and an authentication determining subunit, configured to determine an identity authentication result for the terminal user according to an execution result of the encryption algorithm.

With reference to the first possible implementation manner or the second possible implementation manner, in a third possible implementation manner, the terminal further includes:

an erasing unit, configured to erase, when use of the SIM card is stopped, the encryption algorithm from the first reserved storage space, and erase the encryption algorithm key from the second reserved storage space.

In a fourth aspect, another terminal is provided, and the terminal includes a terminal processor, a baseband apparatus and a UICC, where:

the terminal processor is configured to download information for implementing a SIM card function, and transmit the information for implementing the SIM card function to the baseband apparatus;

the baseband apparatus is configured to write, after receiving the information for implementing the SIM card function, the information for implementing the SIM card function into a reserved storage space on the UICC;

the UICC is configured to process, after the SIM card is activated, the information for implementing the SIM card function to obtain a processing result, and output the processing result to the baseband apparatus; and the baseband apparatus is further configured to authenticate an access identity of a terminal user according to the processing result.

With reference to the first aspect, in a first possible implementation manner, the information downloaded by the terminal processor for implementing the SIM card function includes SIM communication information, a encryption algorithm and a encryption algorithm key; and the baseband apparatus is specifically configured to write the encryption algorithm into a first reserved storage space on the UICC, write the encryption algorithm key into a second reserved storage space on the UICC, and write the SIM communication information into a third reserved storage space on the UICC.

With reference to the first possible implementation manner, in a second possible implementation manner, the UICC is specifically configured to load the encryption algorithm and encryption algorithm key to a RAM of the UICC, use a random number that is obtained from the baseband apparatus and issued by a network side and the encryption algorithm key as input parameters of the encryption algorithm, execute the encryption algorithm, and output an execution result of the encryption algorithm to the baseband apparatus; and the baseband apparatus is specifically configured to determine an identity authentication result for the terminal user according to the execution result.

With reference to the first possible implementation manner or the second possible implementation manner, in a third possible implementation manner, the UICC is also configured to erase, when use of the SIM card is stopped, the encryption algorithm from the first reserved storage space, and erase the encryption algorithm key from the second reserved storage space.

In a fifth aspect, a UICC is provided, where the UICC includes:

a saving unit, configured to save information downloaded by a terminal for implementing a SIM card function into a reserved storage space on the UICC;

a receiving unit, configured to receive an instruction to activate the SIM card; and a processing unit, configured to perform, according to the activation instruction, confidential processing on the information for implementing the SIM card function to obtain a processing result, so that the terminal authenticates an access identity of a terminal user according to the processing result.

With reference to the first aspect, in a first possible implementation manner, the information saved by the saving unit for implementing the SIM card function includes SIM communication information, a encryption algorithm and a encryption algorithm key; and the saving unit includes:

a first saving subunit, configured to save the encryption algorithm downloaded by the terminal into a first reserved storage space on the UICC;

a second saving subunit, configured to save the encryption algorithm key downloaded by the terminal into a second reserved storage space on the UICC; and a third saving subunit, configured to save the SIM communication information downloaded by the terminal into a third reserved storage space on the UICC.

With reference to the first possible implementation manner, in a second possible implementation manner, an authenticating unit includes:

an information loading subunit, configured to load, after receiving the activation instruction, the encryption algorithm and the encryption algorithm key to a RAM of the UICC;

an algorithm executing subunit, configured to use a random number issued by a network side and the encryption algorithm key as input parameters of the encryption algorithm, and execute the encryption algorithm; and a result outputting subunit, configured to output an execution result of the encryption algorithm, so that the terminal determines an identity authentication result for the terminal user according to the execution result.

With reference to the first possible implementation manner or the second possible implementation manner, in a third possible implementation manner, the UICC further includes:

an erasing unit, configured to erase, when use of the SIM card is stopped, the encryption algorithm from the first reserved storage space, and erase the encryption algorithm key from the second reserved storage space.

In a sixth aspect, another UICC is provided, where the UICC is configured to implement a SIM card function on a terminal, and includes an input/output I/O interface, an electrically erasable programmable read-only memory EEPROM, a random access memory RAM and a UICC processor, where:

the I/O interface is configured to receive information downloaded and written by the terminal for implementing the SIM card function;

the EEPROM is configured to save the information received by the I/O interface for implementing the SIM card function; and the UICC processor is configured to load, after the SIM card is activated, the information for implementing the SIM card function, stored on the EEPROM, to the RAM, and process the information for implementing the SIM card function to obtain a processing result, so that the terminal authenticates an access identity of a terminal user according to the processing result.

With reference to the first aspect, in a first possible implementation manner, the information received by the I/O interface for implementing the SIM card function, includes SIM communication information, a encryption algorithm and a encryption algorithm key; and the EEPROM is specifically configured to save the encryption algorithm received by the I/O interface into a first reserved storage space on the EEPROM, save the encryption algorithm key received by the I/O interface into a second reserved storage space on the EEPROM, and save the SIM communication information received by the I/O interface into a third reserved storage space on the EEPROM.

With reference to the first possible implementation manner, in a second possible implementation manner, the UICC processor is specifically configured to load the encryption algorithm and the encryption algorithm key to the RAM, use a random number issued by a network side and the encryption algorithm key as input parameters of the encryption algorithm, execute the encryption algorithm on the RAM, and output an execution result of the encryption algorithm, so that the terminal determines an identity authentication result for a terminal user according to the execution result.

With reference to the first possible implementation manner or the second possible implementation manner, in a third possible implementation manner, the UICC processor is further configured to erase, when use of the SIM card is stopped, the encryption algorithm from the first reserved storage space of the EEPROM, and erase the encryption algorithm key from the second reserved storage space of the EEPROM.

In the embodiments of the present invention, a terminal downloads information for implementing a SIM card function, and writes the information for implementing the SIM card function into a reserved storage space of the terminal, and after the SIM card is activated, an access identity of a terminal user is authenticated by using the information for implementing the SIM card function. In the embodiments of the present invention, when the SIM card function is implemented, there is no need to replace a SIM card chip in the terminal by means of hardware, but instead, the information for implementing the SIM card function is downloaded to the terminal, so as to implement the SIM card function by means of software. Therefore, when a user roams between different regions, the user does not need to frequently replace the SIM card chip, but only needs to implement the SIM card function by means of software according to the embodiments of the present invention, which enhances user convenience and improves user experience. In addition, in the embodiments of the present invention, because the SIM card function is implemented by means of software, it is compatible with a prior SIM card chip in the terminal, and dual standby of soft and hard SIM cards can be implemented on the terminal.

BRIEF DESCRIPTION OF THE DRAWINGS

To illustrate the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

The following embodiments of the present invention provide a method for implementing a SIM card function on a terminal, a terminal and a UICC.

To make the technical solutions in the embodiments of the present invention better understood by a person skilled in the art, and make the foregoing objectives, characteristics and advantages of the embodiments of the present invention more clearly and more comprehensible, the following further describes the technical solutions in the embodiments of the present invention in detail with reference to the accompanying drawings.

Unlike the implementation of a SIM card function through coupling of software and hardware in a prior GSM, in the embodiments of the present invention, the SIM card function can be implemented on a terminal by means of software. The SIM card function implemented by means of software may be called a soft SIM (Soft SIM, SSIM). That is to say, in the embodiments of the present invention, an SSIM can be regarded as an application of the terminal.

Figure 1:
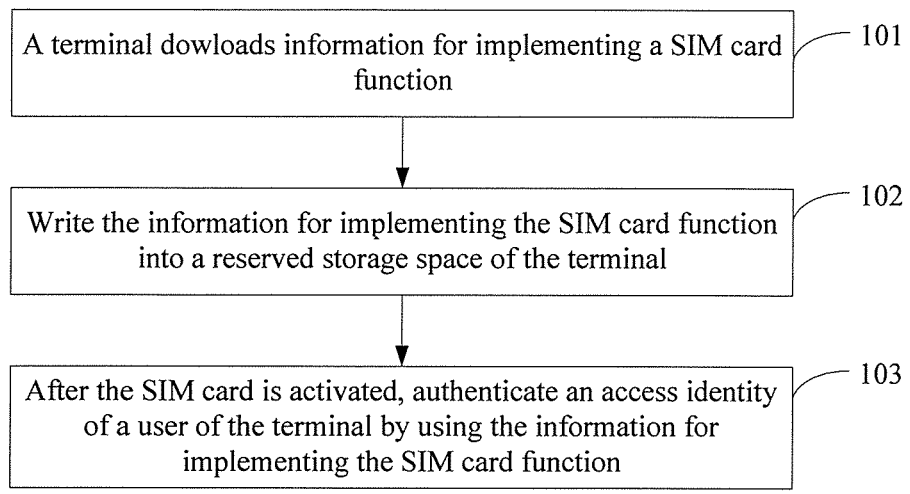
FIG. 1 is a flowchart of a method for implementing a SIM card function on a terminal according to an embodiment of the present invention.

Referring to FIG. 1, FIG. 1 is a flowchart of a method for implementing a SIM card function on a terminal according to an embodiment of the present invention.

Step 101: The terminal downloads information for implementing the SIM card function.

In this embodiment of the present invention, the information for implementing the SIM card function is consistent with information that a SIM card chip disposed inside a terminal requires during operation in the prior art. The information may include SIM communication information (SIM telecomm), a encryption algorithm and a encryption algorithm key, which are used to authenticate an identity of a terminal user. After joining a network, the terminal may download information of the SSIM from the network side.

Step 102: Write the information for implementing the SIM card function into a reserved storage space of the terminal.

Optionally, the terminal may write the encryption algorithm into a first reserved storage space of the terminal, write the encryption algorithm key into a second reserved storage space of the terminal, and write the SIM communication information into a third reserved storage space of the terminal, where the first reserved storage space and the second reserved storage space may be a same storage space.

Step 103: After the SIM card is activated, authenticate an access identity of the terminal user by using the information for implementing the SIM card function.

Optionally, after the SIM card is activated, the terminal loads the encryption algorithm and the encryption algorithm key to a random access memory (Random Access Memory, RAM) of the terminal, uses a random number issued by the network side and the encryption algorithm key as input parameters of the encryption algorithm, executes the encryption algorithm, and determines an identity authentication result for the terminal user according to an execution result of the encryption algorithm.

Further, in this embodiment, when use of the SIM card is stopped, the terminal may further erase the encryption algorithm from the first reserved storage space, and erase the encryption algorithm key from the second reserved storage space, or erase or modify the SIM communication information from or in the third storage space. Then, the terminal may rewrite the encryption algorithm and the encryption algorithm key, or rewrite the SIM communication information when the SIM card is activated again.

It can be seen from the foregoing embodiment that, in this embodiment of the present invention, when a SIM card function is implemented, there is no need to replace a SIM card chip in a terminal by means of hardware, but instead, information for implementing the SIM card function is downloaded to the terminal, so as to implement the SIM card function by means of an SSIM. Therefore, when a user roams between different regions, the user does not need to frequently replace the SIM card chip, but only needs to use the SSIM implemented by means of software in this embodiment of the present invention, which enhances user convenience and improves user experience. In addition, in this embodiment of the present invention, because the SIM card function is implemented by means of software, it is compatible with a prior SIM card chip in the terminal, and dual standby of soft and hard SIM cards can be implemented on the terminal.

Figure 2:
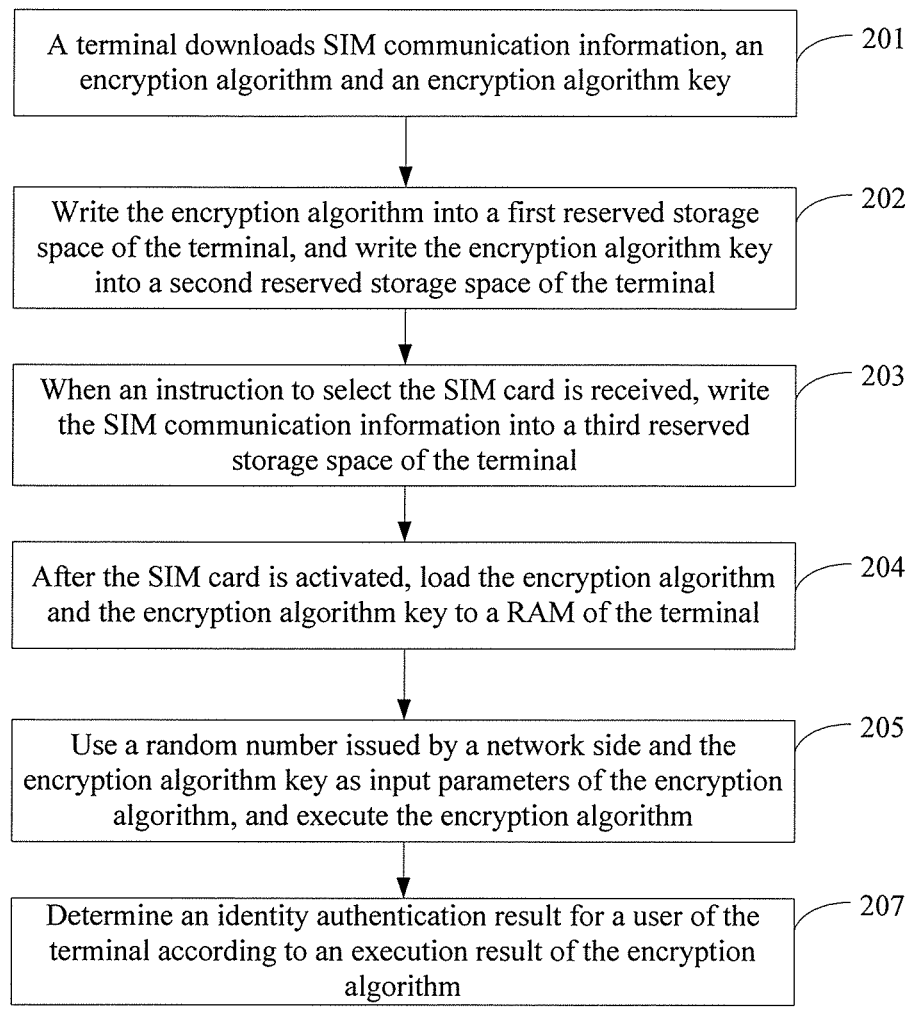
FIG. 2 is a flowchart of a method for implementing a SIM card function on a terminal according to another embodiment of the present invention.

Referring to FIG. 2, FIG. 2 is a flowchart of a method for implementing a SIM card function on a terminal according to another embodiment of the present invention, where this embodiment illustrates a detailed process of implementing a SIM card function on a terminal.

Step 201: The terminal downloads SIM communication information, a encryption algorithm and a encryption algorithm key.

In this embodiment of the present invention, information for implementing the SIM card function is consistent with information that a SIM card chip disposed inside a terminal requires during operation in the prior art. The information may include SIM communication information (SIM telecomm), a encryption algorithm and a encryption algorithm key, which are used to authenticate an identity of a terminal user. After joining a network, the terminal may download the information for implementing the SIM card function from the network side.

Step 202: Write the encryption algorithm into a first reserved storage space of the terminal, and write the encryption algorithm key into a second reserved storage space of the terminal.

Generally, a memory in the terminal includes: a read-only memory (Read-Only Memory, ROM), a RAM and an electrically erasable programmable read-only memory (Electrically Erasable Programmable Read-Only Memory, EEPROM), or the like. In this embodiment, according to characteristics of different memories, the first reserved storage space and the second reserved storage space may be set on an EEPROM, where the downloaded encryption algorithm is written into the first reserved storage space, and the downloaded encryption algorithm key is written into the second reserved storage space; when it is necessary to use the SIM card, the encryption algorithm and the encryption algorithm key are obtained from the storage space of the EEPROM. In this embodiment of the present invention, generally, the encryption algorithm and encryption algorithm key written into the EEPROM can be read only by a component executing the encryption algorithm, but can be erased or rewritten by overwriting. In this embodiment, in order to guarantee security of the encryption algorithm, the encryption algorithm stored in the EEPROM may be encrypted before being stored. Correspondingly, when reading the encryption algorithm, the component executing the encryption algorithm may obtain the encryption algorithm through reverse decryption, and then execute the decrypted encryption algorithm. The specific encryption and decryption processes may adopt prior encryption and decryption technologies, and are not described herein again.

In this embodiment, assuming that a user uses a first SIM card in a first area, when use of the first SIM card is stopped, the terminal may erase from the EEPROM the saved encryption algorithm and encryption algorithm key of the first SIM card, and when the SIM card is used again, the encryption algorithm and encryption algorithm key of the first SIM card may be rewritten into the reserved storage spaces on the EEPROM, or when the terminal roams to a second area, a downloaded encryption algorithm and a downloaded encryption algorithm key of a second SIM card may be written into the reserved storage spaces on the EEPROM. It can be seen that, by applying this embodiment of the present invention, when the terminal roams to a different area, the information for implementing the SIM card function can be obtained and saved in real time.

In addition, when the terminal also includes a SIM card chip, assuming that the user uses the SSIM card provided in this embodiment of the present invention in the first area, when use of the SSIM card is stopped, the terminal can switch to the SIM card chip, and when it switches to the SSIM card again, the information saved in the EEPROM for implementing the SIM card function can be used directly.

Step 203: When an instruction to select the SIM card is received, write the SIM communication information into a third reserved storage space of the terminal.

In this embodiment, the SIM communication information (SIM Telecomm) mainly refers to information associated with a terminal user account, where the information may include an international mobile subscriber identity (International Mobile Subscriber Identification, IMSI), a location area identity (Location Area Identity, LAI), a temporary mobile subscriber identity (Temporary Mobile Subscriber Identity, TMSI), and the like.

The SIM communication information may be saved in form of an application dedicated file (Application Dedicated File, ADF). The SIM communication information can be read, and can also be dynamically written or modified.

Step 204: After the SIM card is activated, load the encryption algorithm and encryption algorithm key to an RAM of the terminal.

In this embodiment, after the SIM card is activated, the terminal may load the encryption algorithm and encryption algorithm key saved in the EEPROM to an RAM for execution.

Step 205: Use a random number issued by a network side and the encryption algorithm key as input parameters of the encryption algorithm, and execute the encryption algorithm.

In this embodiment, the random number (RAND) issued by the network side is usually 128 bits, the encryption algorithm key may be expressed by Ki, and the encryption algorithm may adopt an algorithm A3 or algorithm A8 in the prior art. When authenticating the identity of the user, the terminal uses the random number RAND and the key Ki as inputs to the algorithm A3, so as to work out a response signal (SRES). Besides, the terminal may also use the random number RAND and the key Ki as inputs to the algorithm A8, so as to obtain a key Kc for encrypting and decrypting subsequent communication data.

Step 206: Determine, according to an execution result of the encryption algorithm, an identity authentication result for the terminal user.

In this embodiment, the process of authenticating the identity of the user may be consistent with that in the prior art: the authentication is completed through interaction between the terminal and the network side, where, in step 205, the SRES may be returned to the network side after the SRES is worked out by using the RAND and the key Ki as inputs to the encryption algorithm; the network side searches an authentication centre for the encryption algorithm key Ki corresponding to the user, and uses the key and the RAND as inputs to a encryption algorithm consistent with the encryption algorithm executed by the terminal, so as to work out an SRES; the SRES worked out by the terminal is compared with the SRES worked out by the network side, and if they are consistent, the identity of the terminal user is authenticated.

It can be seen from the foregoing embodiment that, in this embodiment of the present invention, when a SIM card function is implemented, there is no need to replace a SIM card chip in a terminal by means of hardware, but instead, information for implementing the SIM card function is downloaded to the terminal, so as to implement the SIM card function by means of an SSIM. Therefore, when a user roams between different regions, the user does not need to frequently replace the SIM card chip, but only needs to use the SSIM implemented by means of software in this embodiment of the present invention, which enhances user convenience and improves user experience. In addition, in this embodiment of the present invention, because the SIM card function is implemented by means of software, it is compatible with a prior SIM card chip in the terminal, and dual standby of soft and hard SIM cards is implemented on the terminal.

In this embodiment of the present invention, when a SIM card function is implemented by means of software, if a terminal includes a UICC, the terminal may implement the SIM card function by using the UICC. The UICC is a generic term of smart cards with defined physical properties. It may be used as a constituent part of a Third Generation (Third Generation, 3G) mobile communication terminal, and used to store information, such as subscriber information, an authentication key, a short message, a payment mode, and the like. The UICC introduces a concept of multi-application platform and implements a multi-channel mechanism, in which multiple logical applications are running simultaneously. Correspondingly, the UICC may include the following logical modules: a universal subscriber identity module (Universal Subscriber Identity Module, USIM), an IP multimedia service identity module (IP Multimedia Service Identity Module, ISIM), and other non-telecom application modules, such as electronic signature authentication and an e-wallet. The logical modules implement respective functions by means of software, and these logical modules may exist separately or exist together. Different 3G user terminals may choose to use corresponding logical modules according to the type of a radio access network. In this embodiment of the present invention, when the terminal implements the SIM card function based on the UICC by means of software, the SIM card function may be considered as an application on the UICC, which means that an SSIM module is set on the UICC.

Figure 3:
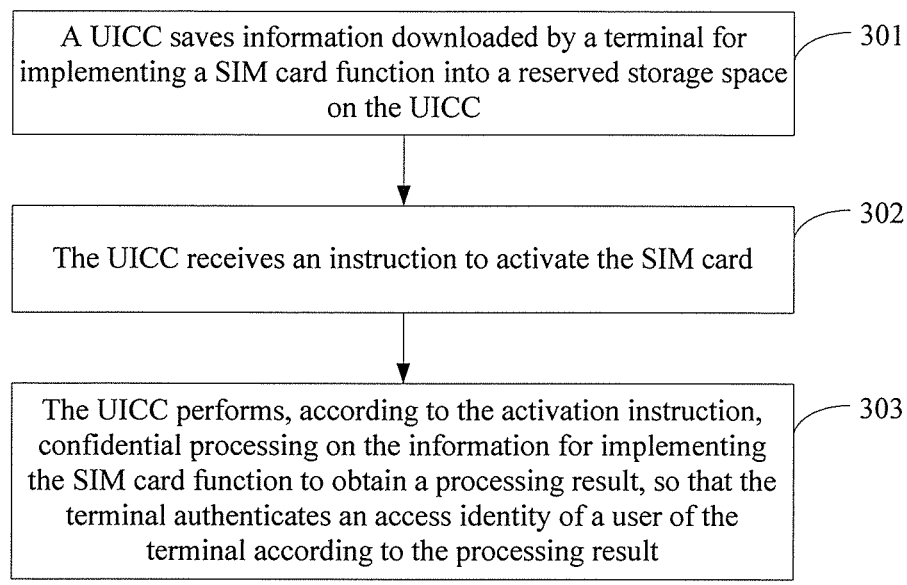
FIG. 3 is a flowchart of a method for implementing a SIM card function on a terminal according to another embodiment of the present invention.

Referring to FIG. 3, FIG. 3 is a flowchart of a method for implementing a SIM card function on a terminal according to another embodiment of the present invention.

Step 301: A UICC saves information downloaded by the terminal for implementing the SIM card function into a reserved storage space on the UICC.

In this embodiment of the present invention, the information for implementing the SIM card function is consistent with information that a SIM card chip disposed inside a terminal requires during operation in the prior art. The information may include SIM communication information (SIM telecomm), a encryption algorithm and a encryption algorithm key, which are used to authenticate an identity of a terminal user. After joining a network, the terminal may download the information of SSIM from the network side.

In this embodiment, the UICC may save the encryption algorithm downloaded by the terminal into a first reserved storage space on the UICC, save the encryption algorithm key downloaded by the terminal into a second reserved storage space on the UICC, and save the SIM communication information downloaded by the terminal into a third reserved storage space on the UICC.

Step 302: The UICC receives an instruction to activate the SIM card.

Step 303: The UICC performs, according to the activation instruction, confidential processing on the information for implementing the SIM card function to obtain a processing result, so that the terminal authenticates an access identity of a terminal user according to the processing result.

Optionally, after receiving the activation instruction, the UICC may load the encryption algorithm and the encryption algorithm key to a RAM of the UICC, use a random number issued by a network side and the encryption algorithm key as input parameters of the encryption algorithm, execute the encryption algorithm, and output an execution result of the encryption algorithm, so that the terminal determines an identity authentication result for the terminal user according to the execution result.

Further, in this embodiment, when use of the SIM card is stopped, the UICC may also erase the encryption algorithm from the first reserved storage space, and erase the encryption algorithm key from the second reserved storage space, or erase or modify the SIM communication information from or in the third storage space. Then, the UICC may rewrite the encryption algorithm and encryption algorithm key, or rewrite the SIM communication information when the SIM card is activated again.

It can be seen from the foregoing embodiment that, in this embodiment of the present invention, when a SIM card function is implemented, there is no need to replace a SIM card chip in a terminal by means of hardware, but instead, information for implementing the SIM card function is downloaded to a UICC of the terminal, so as to implement the SIM card function by means of an SSIM. Therefore, when a user roams between different regions, the user does not need to frequently replace the SIM card chip, but only needs to use the SSIM implemented by means of software in this embodiment of the present invention, which enhances user convenience and improves user experience. In addition, in this embodiment of the present invention, because the SIM card function is implemented by means of software, it is compatible with a prior SIM card chip in the terminal, and dual standby of soft and hard SIM cards can be implemented on the terminal.

Figure 4:
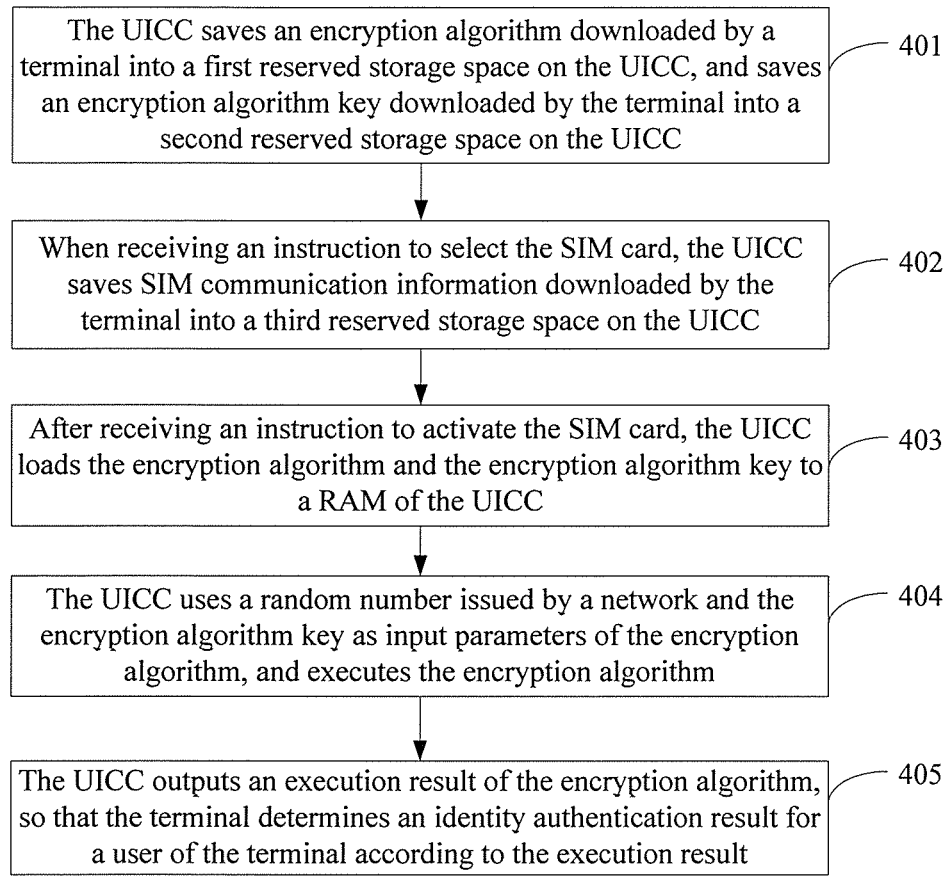
FIG. 4 is a flowchart of a method for implementing a SIM card function on a terminal according to another embodiment of the present invention.

Referring to FIG. 4, FIG. 4 is a flowchart of a method for implementing a SIM card function on a terminal according to another embodiment of the present invention, where this embodiment illustrates a detailed process of implementing a SIM card function by using a UICC in a terminal.

Step 401: The UICC saves a encryption algorithm downloaded by the terminal into a first reserved storage space on the UICC, and saves a encryption algorithm key downloaded by the terminal into a second reserved storage space on the UICC.

In this embodiment of the present invention, information for implementing the SIM card function is consistent with information that a SIM card chip disposed inside a terminal requires during operation in the prior art. The information may include SIM communication information (SIM telecomm), a encryption algorithm and a encryption algorithm key, which are used to authenticate an identity of a terminal user. After joining a network, the terminal may download the information for implementing the SIM card function from the network side.

Generally, the UICC may include a central processing unit (Central Processing Unit, CPU), a ROM, a RAM, an EEPROM and an I/O interface. In this embodiment, according to the characteristics of different memories, the UICC may set a first reserved storage space and a second reserved storage space on an EEPROM, and write the downloaded encryption algorithm into the first reserved storage space, and write the downloaded encryption algorithm key into the second reserved storage space; when it is necessary to use the SIM card, the UICC obtains the encryption algorithm and the encryption algorithm key from the storage space of the EEPROM. In this embodiment of the present invention, generally, the encryption algorithm and encryption algorithm key written into the EEPROM can be read only by the CPU of the UICC, but can be erased or rewritten by overwriting.

In this embodiment, assuming the user uses a first SIM card in a first area, when use of the first SIM card is stopped, the UICC may erase from the EEPROM the saved encryption algorithm and encryption algorithm key of the first SIM card, and when the SIM card is used again, the encryption algorithm and encryption algorithm key of the first SIM card may be rewritten into the reserved storage spaces on the EEPROM, or when the terminal roams to a second area, the UICC may write a downloaded encryption algorithm and a downloaded encryption algorithm key of a second SIM card into the reserved storage spaces on the EEPROM. It can be seen that, by applying this embodiment of the present invention, when the terminal roams to a different area, the information for implementing the SIM card function can be obtained and saved in real time through the UICC in the terminal.

In addition, when the terminal also includes a SIM card chip, assuming that the user uses the SSIM card provided in this embodiment of the present invention in the first area, when use of the SSIM card is stopped, the terminal can switch to the SIM card chip, and when it switches to the SSIM card again, the information saved in the EEPROM for implementing the SIM card function can be used directly.

Step 402: When the UICC receives an instruction to select the SIM card, the UICC saves SIM communication information downloaded by the terminal into a third reserved storage space on the UICC.

In this embodiment, the SIM communication information (SIM Telecomm) mainly refers to information associated with a terminal user account, where the information may include an IMSI, an LAI, a TMSI, and the like. The SIM communication information may be saved in form of an ADF. The UICC may read the SIM communication information from the EEPROM, or dynamically write or modify the SIM communication information saved in the EEPROM.

Step 403: After the UICC receives an instruction to activate the SIM card, the UICC loads the encryption algorithm and the encryption algorithm key to an RAM of the UICC.

In this embodiment, after the UICC receives the SIM card activation instruction, the CPU of the UICC may load the encryption algorithm and encryption algorithm key saved in the EEPROM to the RAM.

Step 404: The UICC uses a random number issued by a network side and the encryption algorithm key as input parameters of the encryption algorithm, and executes the encryption algorithm.

In this embodiment, the random number (RAND) issued by the network side is usually 128 bits, the encryption algorithm key may be expressed by Ki, and the encryption algorithm may adopt an algorithm A3 or algorithm A8 in the prior art. When the terminal authenticates the identity of the user, the UICC may use the random number RAND and the key Ki as inputs to the encryption algorithm, so as to work out a response signal (SRES). Besides, the UICC may also use the random number RAND and the key Ki as inputs to the algorithm A8, so as to obtain a key Kc for encrypting and decrypting subsequent communication data.

Step 405: The UICC outputs an execution result of the encryption algorithm, so that the terminal determines an identity authentication result for the terminal user according to the execution result.

In this embodiment, the UICC outputs the execution result of the encryption algorithm obtained in step 404; the subsequent process that the terminal authenticates the identity of the user may be consistent with that in the prior art: the authentication is completed through interaction between the terminal and the network side, where, in step 404, the SRES may be returned to the network side after the UICC works out the SRES by using the RAND and the key Ki as inputs to the encryption algorithm; the network side searches an authentication centre for the encryption algorithm key Ki corresponding to the user, and uses the key and the RAND as inputs to a encryption algorithm consistent with the encryption algorithm executed by the UICC in the terminal, so as to work out an SRES; the SRES worked out by the UICC is compared with the SRES worked out by the network side, and if they are consistent, the identity of the terminal user is authenticated.

It can be seen from the foregoing embodiment that, in this embodiment of the present invention, when a SIM card function is implemented, there is no need to replace a SIM card chip in a terminal by means of hardware, but instead, information for implementing the SIM card function is downloaded to the terminal, so as to implement the SIM card function by means of an SSIM. Therefore, when a user roams between different regions, the user does not need to frequently replace the SIM card chip, but only needs to use the SSIM implemented by means of software in this embodiment of the present invention, which enhances user convenience and improves user experience. In addition, in this embodiment of the present invention, because the SIM card function is implemented by means of software, it is compatible with a prior SIM card chip in the terminal, and dual standby of soft and hard SIM cards can be implemented on the terminal.

Corresponding to the embodiments of the method for implementing a SIM card function on a terminal in the present invention, the present invention further provides embodiments of a terminal and a UICC.

Figure 5:
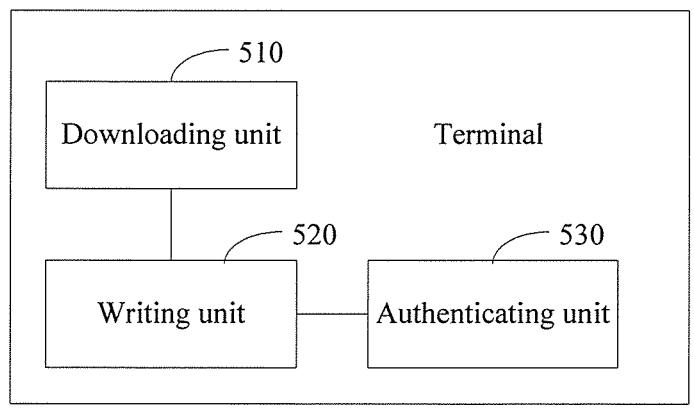
FIG. 5 is a block diagram of a terminal according to an embodiment of the present invention.

Referring to FIG. 5, FIG. 5 is a block diagram of a terminal according to an embodiment of the present invention.

The terminal includes: a downloading unit 510, a writing unit 520 and an authenticating unit 530, where the downloading unit 510 is configured to download information for implementing a SIM card function;

the writing unit 520 is configured to write the information downloaded by the downloading unit 510 for implementing the SIM card function into a reserved storage space of the terminal; and the authenticating unit 530 is configured to authenticate, after the SIM card is activated, an access identity of a terminal user by using the information written by the writing unit 520 for implementing the SIM card function.

The information downloaded by the downloading unit 510 for implementing the SIM card function may include SIM communication information, a encryption algorithm and a encryption algorithm key.

Specifically, the writing unit 520 may include: (the following subunits are not illustrated in FIG. 5)

a first writing subunit, configured to write the encryption algorithm into a first reserved storage space of the terminal;

a second writing subunit, configured to write the encryption algorithm key into a second reserved storage space of the terminal; and a third writing subunit, configured to write the SIM communication information into a third reserved storage space of the terminal.

Specifically, the authenticating unit 530 may include: (the following subunits are not illustrated in FIG. 5)

an information loading subunit, configured to load the encryption algorithm and the encryption algorithm key to a RAM of the terminal;

an algorithm executing subunit, configured to use a random number issued by a network side and the encryption algorithm key as input parameters of the encryption algorithm, and execute the encryption algorithm; and an authentication determining subunit, configured to determine an identity authentication result for the terminal user according to an execution result of the encryption algorithm.

Further, the terminal may further include: an erasing unit (which is not illustrated in FIG. 5), configured to erase, when use of the SIM card is stopped, the encryption algorithm from the first reserved storage space, and erase the encryption algorithm key from the second reserved storage space.

Figure 6:
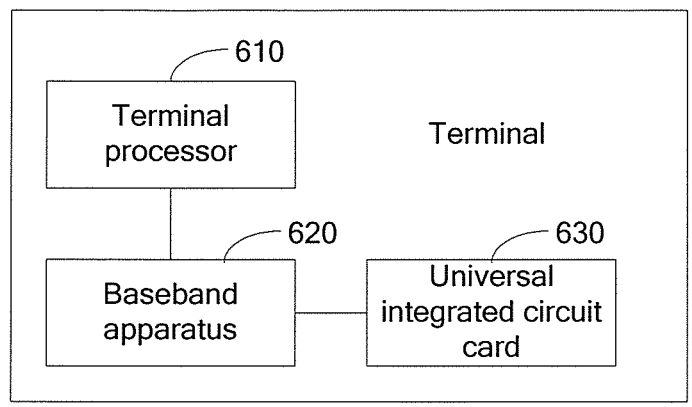
FIG. 6 is a block diagram of a terminal according to another embodiment of the present invention.

Referring to FIG. 6, FIG. 6 is a block diagram of a terminal according to another embodiment of the present invention.

The terminal includes: a terminal processor 610, a baseband apparatus 620 and a UICC 630, where:

the terminal processor 610 is configured to download information for implementing a SIM card function, and transmit the information for implementing the SIM card function to the baseband apparatus 620;

the baseband apparatus 620 is configured to write, after receiving the information transmitted by the terminal processor 610 for implementing the SIM card function, the information for implementing the SIM card function into a reserved storage space on the UICC 630;

the UICC 630 is configured to process, after the SIM card is activated, the information for implementing the SIM card function to obtain a processing result, and output the processing result to the baseband apparatus; and the baseband apparatus 620 is further configured to authenticate an access identity of a terminal user according to the processing result.

The information downloaded by the terminal processor 610 for implementing the SIM card function may include SIM communication information, a encryption algorithm and a encryption algorithm key.

The baseband apparatus 620 may be specifically configured to write the encryption algorithm into a first reserved storage space on the UICC 630, write the encryption algorithm key into a second reserved storage space on the UICC 630, and write the SIM communication information into a third reserved storage space on the UICC 630.

The UICC 630 may be specifically configured to load the encryption algorithm and the encryption algorithm key to a RAM of the UICC 630, use a random number that is obtained from the baseband apparatus and issued by a network side and the encryption algorithm key as input parameters of the encryption algorithm, execute the encryption algorithm, and output an execution result of the encryption algorithm to the baseband apparatus 620. The baseband apparatus 620 may be specifically configured to determine an identity authentication result for the terminal user according to the execution result.

Further, the UICC may further be configured to erase, when use of the SIM card is stopped, the encryption algorithm from the first reserved storage space, and erase the encryption algorithm key from the second reserved storage space.

Figure 7:
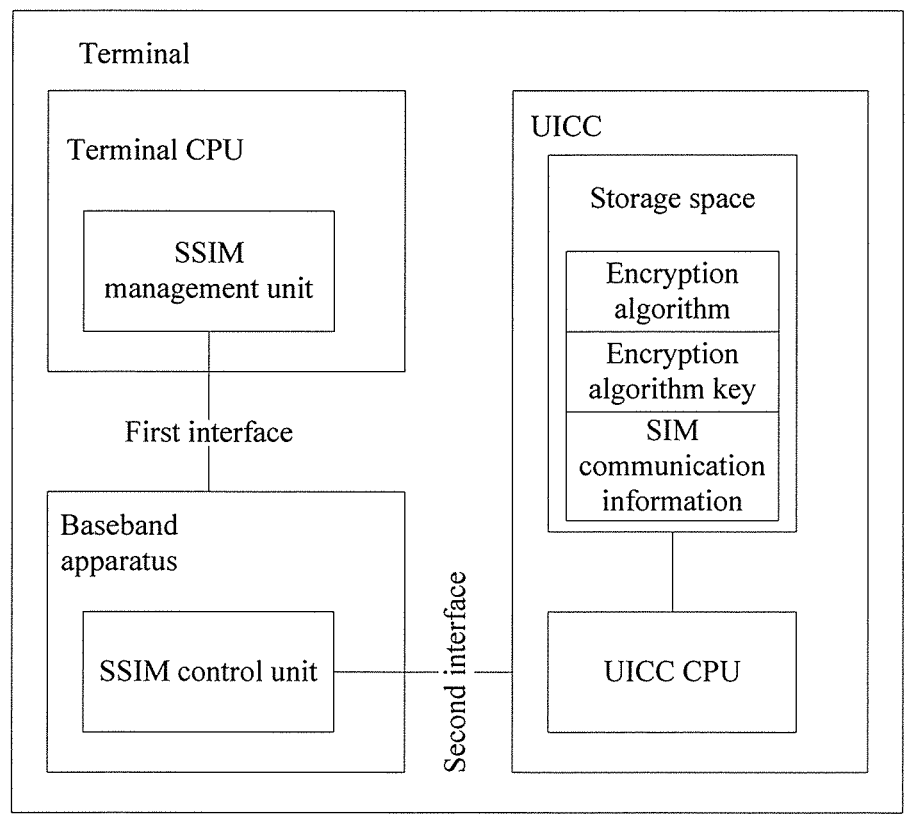
FIG. 7 is a schematic structural diagram of a terminal according to an embodiment of the present invention.

Referring to FIG. 7, FIG. 7 is a schematic structural diagram of a terminal according to an embodiment of the present invention.

The terminal includes: a terminal CPU, a baseband apparatus and a UICC, where the terminal CPU may include an SSIM management unit, the baseband apparatus may internally include an SSIM control unit, and the UICC may internally include a UICC CPU and a storage space. In this embodiment, an SSIM card function is implemented through interaction among the SSIM management unit, SSIM control unit and UICC.

The SSIM management unit interacts with the baseband apparatus through a first interface, where the first interface may be a serial interface for transmitting an AT (Attention, attention) instruction, and may comply with the 3GPP TS 27.007 standard and be used to transmit an instruction for writing a encryption algorithm, an instruction for erasing a encryption algorithm, an instruction for writing a encryption algorithm key, an instruction for erasing a encryption algorithm key, and an instruction for reading and writing SIM communication information; the SSIM control unit interacts with the UICC through a second interface, where the second interface may be a SIM ME (Mobile Equipment) interface, and may be extended based on compliance with the ETSI TS 102 221 standard or the 3GPP TS 51.001 standard to transmit an instruction for writing a encryption algorithm, an instruction for erasing a encryption algorithm, an instruction for writing a encryption algorithm key, an instruction for erasing a encryption algorithm key, and an instruction for reading and writing SIM communication information.

The SSIM management unit downloads SIM communication information, a encryption algorithm and a encryption algorithm key; the SSIM management unit transmits the encryption algorithm and the encryption algorithm key to the SSIM control unit of the baseband apparatus through the first interface, and the SSIM control unit writes, through the second interface, the encryption algorithm into a space allocated for the encryption algorithm on the storage space of the UICC, and writes the encryption algorithm key into a space allocated for the encryption algorithm on the storage space of the UICC, where the encryption algorithm and encryption algorithm key cannot be read from the storage space, but can be overwritten or erased; when an SSIM card is chosen to be used, the SSIM management unit transmits the downloaded SIM communication information to the SSIM control unit of the baseband apparatus through the first interface, and the SSIM control unit writes, through the second interface, the SIM communication information into a space allocated for the SIM communication information on the storage space of the UICC; when the SSIM card is activated, the UICC CPU loads the encryption algorithm and encryption algorithm key in the storage space to an RAM of the UICC, at which time, the SSIM control unit sends a random number issued by a network side to the UICC CPU, and the UICC CPU runs the encryption algorithm according to the random number and the encryption algorithm key, so as to authenticate an identity of a terminal user. For a specific authentication process, reference may be made to the descriptions of the foregoing method embodiments, and the specific process is not described herein again.

In the foregoing embodiment, there is no restriction on the order in which the encryption algorithm and the encryption algorithm key is written into the storage space; and the foregoing information may be written by using one instruction or two separate instructions.

It should be noted that FIG. 7 illustrates merely an exemplary structure of the terminal. In practical application, the internal structure of the terminal is not limited to the example shown in FIG. 7. For example, the SSIM management unit may also not communicate with the baseband apparatus directly through the first interface, but instead, the SSIM management unit may be connected to a radio interface layer (Radio Interface Layer, RIL) unit in the terminal CPU, where the RIL unit communicates with the baseband apparatus through a serial port. That is to say, the RIL unit may forward the SIM communication information, encryption algorithm and encryption algorithm key downloaded by the SSIM management unit to the SSIM control unit of the baseband apparatus.

Figure 8:
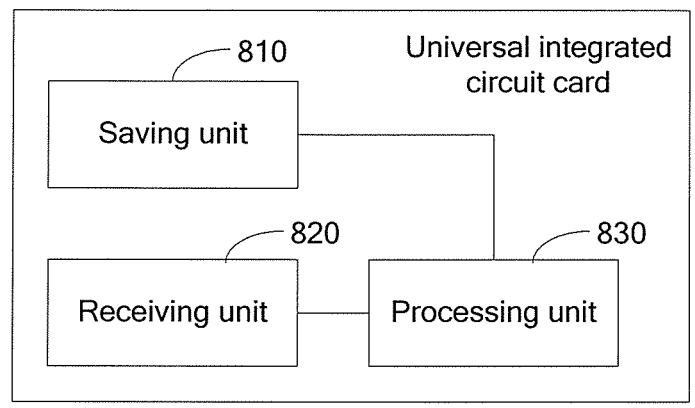
FIG. 8 is a block diagram of a UICC according to an embodiment of the present invention.

Referring to FIG. 8, FIG. 8 is a block diagram of a UICC according to an embodiment of the present invention, where the UICC is usually disposed in a terminal.

The UICC includes: a saving unit 810, a receiving unit 820 and a processing unit 830, where:

the saving unit 810 is configured to save information downloaded by the terminal for implementing a SIM card function into a reserved storage space on the UICC;

the receiving unit 820 is configured to receive an instruction to activate the SIM card; and the processing unit 830 is configured to perform, according to the activation instruction, confidential processing on the information for implementing the SIM card function to obtain a processing result, so that the terminal authenticates an access identity of a terminal user according to the processing result.

The information saved by the saving unit 810 for implementing the SIM card function may include SIM communication information, a encryption algorithm and a encryption algorithm key.

Optionally, the saving unit 810 may include: (the following subunits are not illustrated in FIG. 8)

a first saving subunit, configured to save the encryption algorithm downloaded by the terminal into a first reserved storage space on the UICC;

a second saving subunit, configured to save the encryption algorithm key downloaded by the terminal into a second reserved storage space on the UICC; and a third saving subunit, configured to save the SIM communication information downloaded by the terminal into a third reserved storage space on the UICC.

Optionally, the processing unit 830 may include: (the following subunits are not illustrated in FIG. 8)

an information loading subunit, configured to load, after the activation instruction is received, the encryption algorithm and encryption algorithm key to a RAM of the UICC;

an algorithm executing subunit, configured to use a random number issued by a network side and the encryption algorithm key as input parameters of the encryption algorithm, and execute the encryption algorithm; and a result outputting subunit, configured to output an execution result of the encryption algorithm, so that the terminal determines an identity authentication result for the terminal user according to the execution result.

Further, the UICC may also include: an erasing unit (which is not illustrated in FIG. 8), configured to erase, when use of the SIM card is stopped, the encryption algorithm from the first reserved storage space, and erase the encryption algorithm key from the second reserved storage space.

Figure 9:
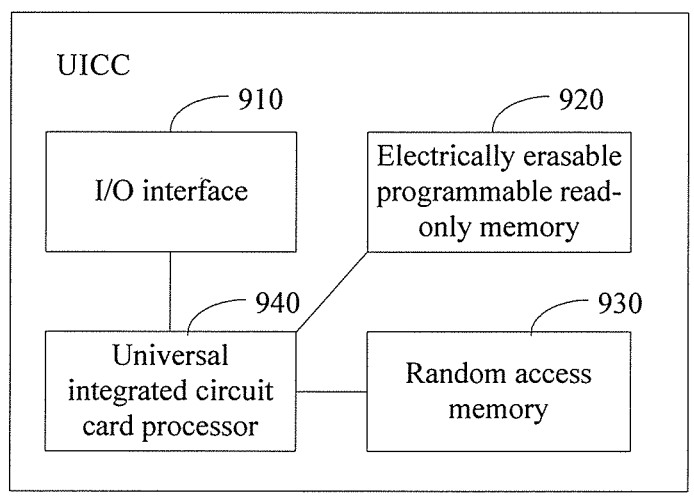
FIG. 9 is a block diagram of a UICC according to another embodiment of the present invention.

Referring to FIG. 9, FIG. 9 is a block diagram of a UICC according to another embodiment of the present invention.

The UICC includes: an I/O interface 910, an EEPROM 920, a RAM 930 and a UICC processor 940, where:

the I/O interface 910 is configured to receive information downloaded and written by a terminal for implementing a SIM card function;

the EEPROM 920 is configured to save the information received by the I/O interface 910 for implementing the SIM card function; and the UICC processor 940 is configured to load, after the SIM card is activated, the information saved in the EEPROM 920 for implementing the SIM card function to the RAM 930, and process the information for implementing the SIM card function to obtain a processing result, so that the terminal authenticates an access identity of a terminal user according to the processing result.

The information received by the I/O interface 910 for implementing the SIM card function may include SIM communication information, a encryption algorithm and a encryption algorithm key.

Optionally, the EEPROM may be specifically configured to save the encryption algorithm received by the I/O interface 910 into a first reserved storage space on the EEPROM 920, save the encryption algorithm key received by the I/O interface 910 into a second reserved storage space on the EEPROM 920, and save the SIM communication information received by the I/O interface 910 into a third reserved storage space on the EEPROM 920.

Optionally, the UICC processor 940 may be specifically configured to load the encryption algorithm and the encryption algorithm key to the RAM 930, use a random number issued by a network side and the encryption algorithm key as input parameters of the encryption algorithm, execute the encryption algorithm on the RAM 930, and output an execution result of the encryption algorithm, so that the terminal determines an identity authentication result for the terminal user according to the execution result.

Optionally, the UICC processor 940 may further be configured to erase, when use of the SIM card is stopped, the encryption algorithm from the first reserved storage space of the EEPROM 920, and erase the encryption algorithm key from the second reserved storage space of the EEPROM 920.

It can be seen from the foregoing embodiment that, a terminal downloads information for implementing a SIM card function, and writes the information for implementing the SIM card function into a reserved storage space of the terminal, and after the SIM card is activated, authenticates an access identity of a terminal user by using the information for implementing the SIM card function. In this embodiment of the present invention, when the SIM card function is implemented, there is no need to replace a SIM card chip in the terminal by means of hardware, but instead, the information for implementing the SIM card function is downloaded to the terminal, so as to implement the SIM card function by means of software. Therefore, when a user roams between different regions, the user does not need to frequently replace the SIM card chip, but only needs to implement the SIM card function by means of software according to this embodiment of the present invention, which enhances user convenience and improves user experience. In addition, in this embodiment of the present invention, because the SIM card function is implemented by means of software, it is compatible with a prior SIM card chip in the terminal, and dual standby of soft and hard SIM cards can be implemented on the terminal.

A person skilled in the art may clearly understand that the technology in the embodiments of the present invention may be implemented by means of software in addition to a necessary universal hardware platform. Based on such an understanding, the technical solutions in the embodiments of the present invention essentially, or the part contributing to the prior art may be implemented in the form of a software product. The computer software product may be stored in a storage medium, such as a ROM/RAM, a disk and an optical disc, and the like, and may include several instructions for instructing a computer device (which may be a personal computer, a server, a network device, or the like) to execute the method described in all or a part of the embodiments of the present invention.

The embodiments of the present specification are described in a progressive manner. The same or similar parts of the embodiments can be referenced mutually. The focus of each embodiment is placed on a difference from other embodiments. Especially, for the system embodiments, as they are fundamentally similar to the method embodiments, their description is simplified, and for relevant parts, reference may be made to the description of the method embodiments.

The foregoing embodiments of the present invention do not constitute any limitation on the protection scope of the present invention. Any modification, equivalent replacement, improvement and the like based on the spirit and principle of the present invention shall fall with the protection scope of the present invention.

What is claimed is:

1. A method for implementing a subscriber identity module (SIM) card function on a terminal, the method comprising:

downloading information for implementing the SIM card function, the downloaded information comprising SIM communication information, an encryption algorithm, and an encryption algorithm key;

writing the downloaded encryption algorithm into a first reserved storage space of an electrically erasable programmable read-only memory (EEPROM) of the terminal that is separate from the SIM card;

writing the downloaded encryption algorithm key into a second reserved storage space of the EEPROM of the terminal;

when an instruction to select the SIM card is received, writing the downloaded SIM communication information into a third reserved storage space of the EEPROM of the terminal;

after the SIM card is activated, authenticating an access identity of a user of the terminal, the authenticating comprising:

loading the encryption algorithm and the encryption algorithm key from the EEPROM to a random access memory (RAM) of the terminal;

using a random number issued by a network side and the encryption algorithm key as input parameters of the encryption algorithm, and executing the encryption algorithm; and determining an identity authentication result for the terminal user according to an execution result of the encryption algorithm; and when use of the SIM card is stopped, erasing the encryption algorithm from the first reserved storage space of the EEPROM, and erasing the encryption algorithm key from the second reserved storage space of the EEPROM.

2. The method according to claim 1, wherein the downloaded SIM communication information is saved as an application dedicated file (ADF).

3. A method for implementing a subscriber identity module (SIM) card function on a terminal, wherein the method is applied to a terminal comprising a universal integrated circuit card (UICC), the method comprising:

saving, by the UICC, information downloaded by the terminal for implementing the SIM card function into a reserved storage space of an electrically erasable programmable read-only memory (EEPROM) on the UICC that is separate from the SIM card, the downloaded information comprising an encryption algorithm and an encryption algorithm key, the saving comprising:

saving the encryption algorithm downloaded by the terminal into a first reserved storage space of the EEPROM, and saving the encryption algorithm key downloaded by the terminal into a second reserved storage space of the EEPROM;

when an instruction to select the SIM card is received, saving, by the UICC, SIM communication information downloaded by the terminal into a third reserved storage space of the EEPROM on the UICC;

receiving, by the UICC, an instruction to activate the SIM card;

performing, by the UICC according to the activation instruction, confidential processing on the information for implementing the SIM card function and the SIM communication information, the confidential processing comprising:

after receiving the activation instruction, loading, by the UICC, the encryption algorithm and the encryption algorithm key from the EEPROM to a random access memory (RAM) of the UICC;

using, by the UICC, a random number issued by a network side and the encryption algorithm key as input parameters of the encryption algorithm, and executing the encryption algorithm; and outputting, by the UICC, an execution result of the encryption algorithm, the execution result configured to enable the terminal to determine an access identity of a terminal user; and when use of the SIM card is stopped, erasing, by the UICC, the encryption algorithm from the first reserved storage space of the EEPROM, and erasing the encryption algorithm key from the second reserved storage space of the EEPROM.

4. The method according to claim 3, wherein the downloaded SIM communication information is saved as an application dedicated file (ADF).

5. A terminal, comprising:

a downloading unit, configured to download information for implementing a SIM card function, the downloaded information comprising SIM communication information, an encryption algorithm, and an encryption algorithm key;

a writing unit, configured to:

write the encryption algorithm into a first reserved storage space of an electrically erasable programmable read-only memory (EEPROM) of the terminal that is separate from the SIM card, write the downloaded encryption algorithm key into a second reserved storage space of the EEPROM of the terminal, and when an instruction to select the SIM card is received, write the SIM communication information into a third reserved storage space of the EEPROM of the terminal;

an authenticating unit, configured to authenticate, after the SIM card is activated, an access identity of a terminal user by using the information written by the writing unit for implementing the SIM card function, the authenticating unit comprising:

an information loading subunit, configured to load the encryption algorithm and the encryption algorithm key from the EEPROM to a random access memory (RAM) of the terminal;

an algorithm executing subunit, configured to use a random number issued by a network side and the encryption algorithm key as input parameters of the encryption algorithm, and execute the encryption algorithm; and an authentication determining subunit, configured to determine an identity authentication result for the terminal user according to an execution result of the encryption algorithm; and an erasing unit, configured to erase, when use of the SIM card is stopped, the encryption algorithm from the first reserved storage space of the EEPROM, and erase the encryption algorithm key from the second reserved storage space of the EEPROM.

6. The terminal according to claim 5, wherein the downloaded SIM communication information is saved as an application dedicated file (ADF).

7. A terminal, comprising:

a terminal processor;

a baseband apparatus; and a universal integrated circuit card (UICC);

wherein the terminal processor is configured to download information for implementing a subscriber identity module (SIM) card function, and transmit the downloaded information for implementing the SIM card function to the baseband apparatus, the downloaded information comprising SIM communication information, an encryption algorithm, and an encryption algorithm key;

wherein the baseband apparatus is configured to:

write, after receiving the information for implementing the SIM card function, the encryption algorithm into a first reserved storage space of an electrically erasable programmable read-only memory (EEPROM) on the UICC that is separate from the SIM card, write the encryption algorithm key into a second reserved storage space of the EEPROM on the UICC, and write, after an instruction to select the SIM card is received, the SIM communication information into a third reserved storage space of the EEPROM on the UICC;

wherein the UICC is configured to process, after the SIM card is activated, the information for implementing the SIM card function, wherein to process the information, the UICC is configured to load the encryption algorithm and the encryption algorithm key from the EEPROM to a random access memory (RAM) of the UICC, use a random number that is obtained from the baseband apparatus and issued by a network side and the encryption algorithm key as input parameters of the encryption algorithm, execute the encryption algorithm, and output an execution result of encryption algorithm to the baseband apparatus;

wherein the baseband apparatus is further configured to authenticate an access identity of a terminal user according to the execution result; and wherein the UICC is further configured to erase, when use of the SIM card is stopped, the encryption algorithm from the first reserved storage space of the EEPROM, and erase the encryption algorithm key from the second reserved storage space of the EEPROM.

8. The terminal according to claim 7, wherein the downloaded SIM communication information is saved as an application dedicated file (ADF).

9. A universal integrated circuit card (UICC) disposed in a terminal, the UICC comprising:

a saving unit, configured to:
save information downloaded by the terminal for implementing a subscriber identity module (SIM) card function into a reserved storage space of an electrically erasable programmable read-only memory (EEPROM) on the UICC that is separate from the SIM card, the downloaded information comprising an encryption algorithm and an encryption algorithm key, the encryption algorithm saved into a first reserved storage space of the EEPROM, the encryption algorithm key saved into a second reserved storage space of the EEPROM, and when an instruction to select the SIM card is received, save SIM communication information downloaded by the terminal into a third reserved storage space of the EEPROM on the UICC;

a receiving unit, configured to receive an instruction to activate the SIM card;

a processing unit, configured to perform, according to the activation instruction, confidential processing on the information for implementing the SIM card function and the SIM communication information, the processing unit comprising:
an information loading subunit, configured to load, after the activation instruction is received, the encryption algorithm and the encryption algorithm key from the EEPROM to a random access memory (RAM) of the UICC;

an algorithm executing subunit, configured to use a random number issued by a network side and the encryption algorithm key as input parameters of the encryption algorithm, and execute the encryption algorithm; and a result outputting subunit, configured to output an execution result of the encryption algorithm, the execution result configured to enable the terminal to determine an access identity of a terminal user; and an erasing unit, configured to erase, when use of the SIM card is stopped, the encryption algorithm from the first reserved storage space of the EEPROM, and erase the encryption algorithm key from the second reserved storage space of the EEPROM.

10. The UICC according to claim 9, wherein the downloaded SIM communication information is saved as an application dedicated file (ADF).

11. A universal integrated circuit card (UICC) configured to implement a subscriber identity module (SIM) card function on a terminal, the UICC comprising:

an input/output (I/O) interface configured to receive information downloaded and written by the terminal for implementing the SIM card function, the downloaded information comprising SIM communication information, an encryption algorithm, and an encryption algorithm key;

an electrically erasable programmable read-only memory (EEPROM) configured to save the encryption algorithm into a first reserved storage space of the EEPROM, save the encryption algorithm key into a second reserved storage space of the EEPROM, and, when an instruction to select the SIM card is received, save the SIM communication information into a third reserved storage space of the EEPROM; and a UICC processor configured to load, after the SIM card is activated, the encryption algorithm and the encryption algorithm key to a random access memory (RAM), use a random number issued by a network side and the encryption algorithm key as input parameters of the encryption algorithm, execute the encryption algorithm on the RAM, and output an execution result of the encryption algorithm, the execution result configured to enable the terminal to authenticate an access identity of a terminal user, wherein the UICC processor is further configured to erase, when use of the SIM card is stopped, the encryption algorithm from the first reserved storage space of the EEPROM, and erase the encryption algorithm key from the second reserved storage space of the EEPROM.

12. The UICC according to claim 11, wherein the downloaded SIM communication information is saved as an application dedicated file (ADF).

* * * * *